July 28, 1953   N. L. TUROFF   2,646,617
ASSEMBLY MACHINE
Filed April 15, 1949   5 Sheets-Sheet 1

Inventor
Nicholas L. Turoff,
By
Flocks and Simon
ATTORNEYS

July 28, 1953          N. L. TUROFF          2,646,617
                       ASSEMBLY MACHINE
Filed April 15, 1949                         5 Sheets-Sheet 3
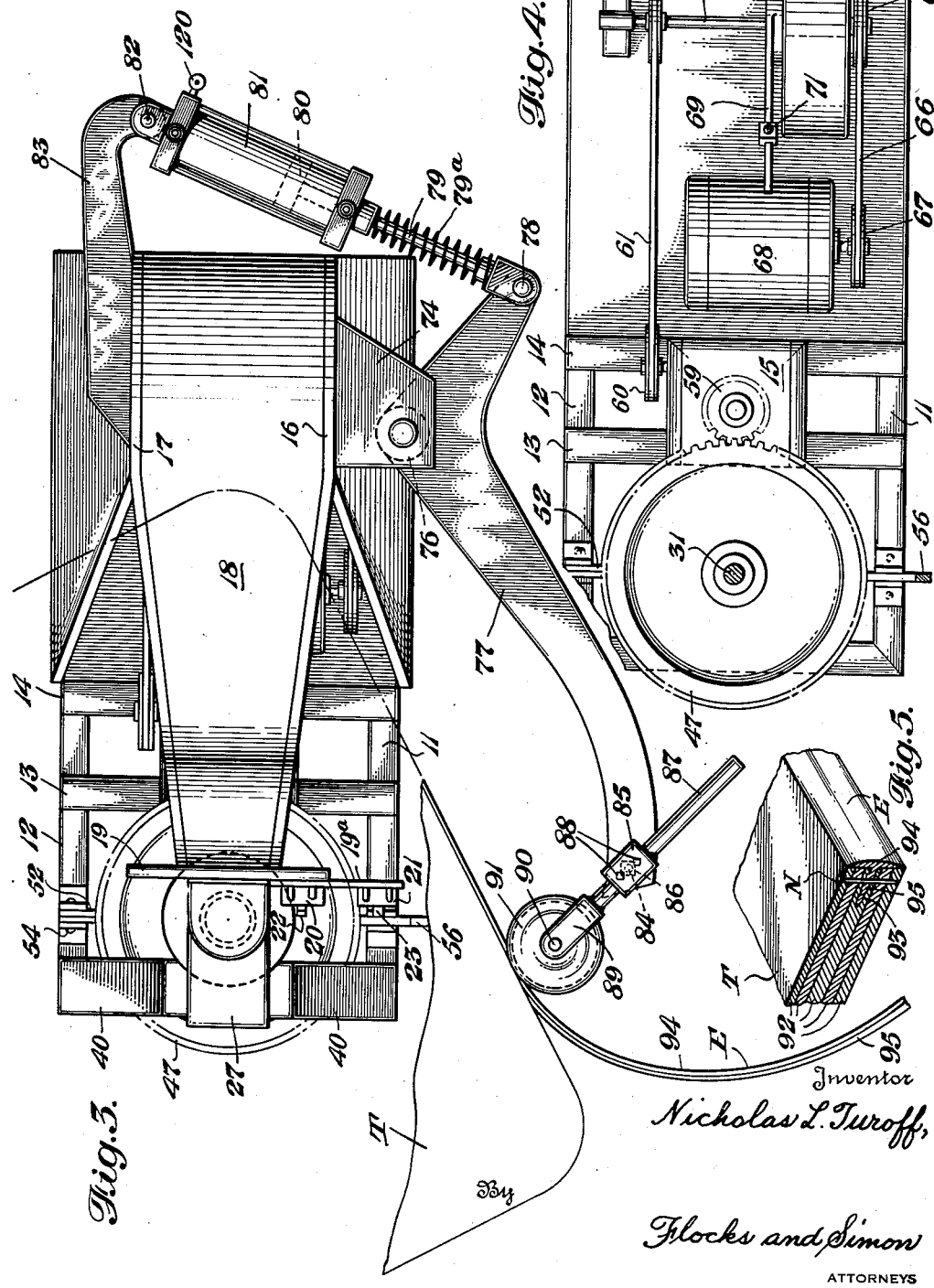
Inventor
Nicholas L. Turoff,
By
Flocks and Simon
ATTORNEYS July 28, 1953     N. L. TUROFF     2,646,617
ASSEMBLY MACHINE
Filed April 15, 1949     5 Sheets-Sheet 5

Inventor
Nicholas L. Turoff,
By
Flocks and Simon
ATTORNEYS

Patented July 28, 1953

2,646,617

UNITED STATES PATENT OFFICE 2,646,617

ASSEMBLY MACHINE

Nicholas L. Turoff, Baltimore, Md., assignor to National Store Fixture Co., Inc., Baltimore, Md., a corporation of Maryland Application April 15, 1949, Serial No. 87,685

11 Claims. (Cl. 29—200)

The present invention relates to an assembly machine. More particularly the present invention relates to a machine for assembling a table top or a similar member with edging therefor.

Table tops for restaurant tables, counters, or other articles of furniture, are conventionally made of laminated wood or other materials. In order to give tops of this character a finished appearance, it is customary to provide a central groove about the edges thereof and to insert within the groove the central rib of an edging material usually of metal or plastic having a T-shaped conformation. In actual practice it has been rather difficult to insert the central rib of the T edging within the groove and it has been difficult to smoothly conform the edging to a top, especially where the top is not round but of a rectangular shape provided with rounded corners.

A general object of the present invention, therefore, is to provide a novel process for the assembly of a table top or the like with edging therefor.

A second general object of the present invention is to provide a novel machine for assembling a table top with edging therefor.

A third object of the present invention is to provide a novel machine for the assembly of a table top or the like with a means for firmly and uniformly assembling an edging with the top as by exerting a uniform pressure thereon both in a direction to press the edging toward the edge of the top, and also in a direction to stretch the edging or produce a tension therein.

A fourth object of the present invention is to provide a means for rotating a table top at variable speeds while assembling an edging therewith so as to insure uniform assembly of edging and tops of any desired shape.

Other objects and the nature and advantages of the instant invention will be apparent from the following description taken in conjunction with the accompanying drawings, wherein:

Fig. 3 is an enlarged view of a portion of the machine illustrating the pressure arm and roller;

Fig. 4 is a plan view of the drive;

Fig. 5 is a prospective detail of a portion of a table top;

Figure 1:
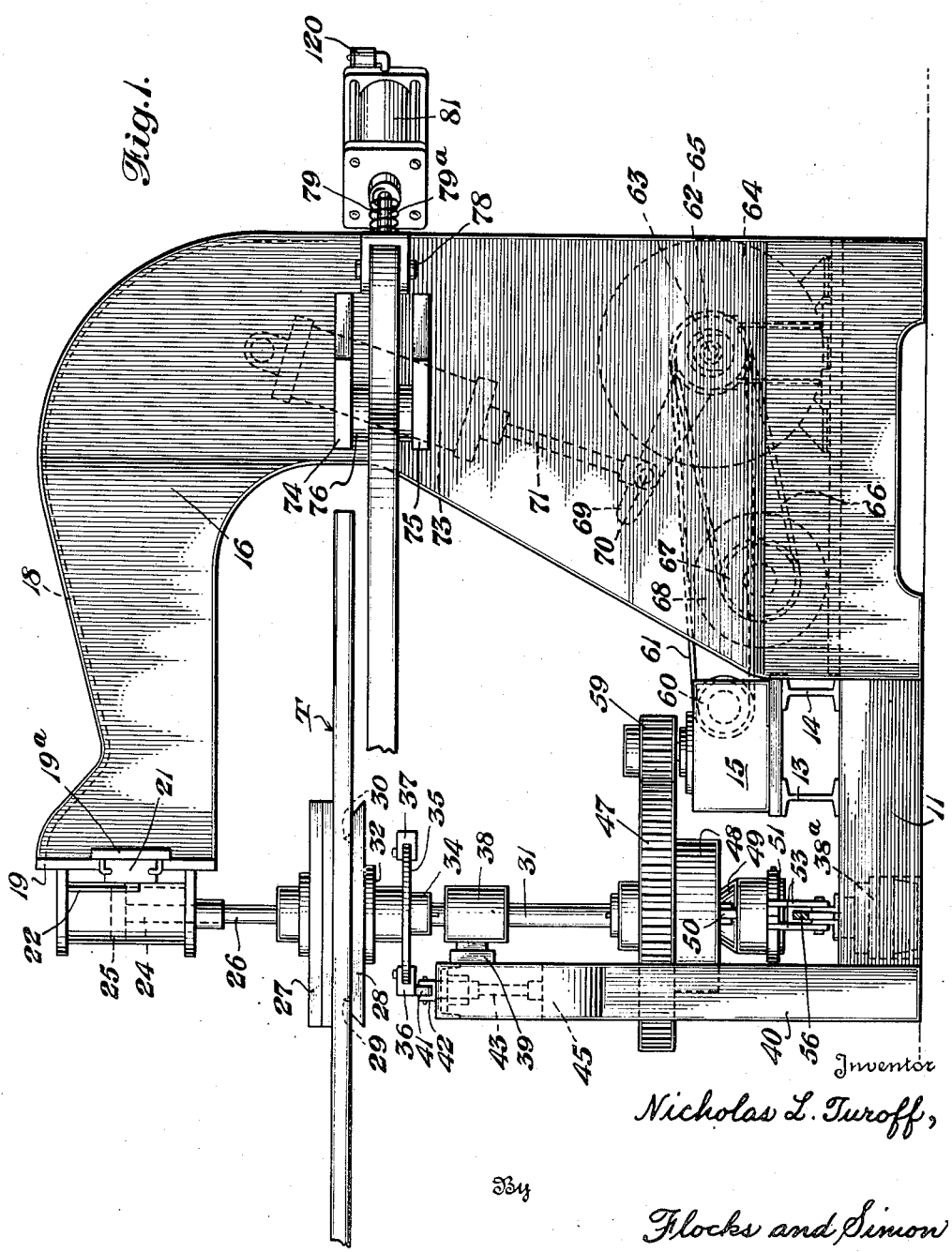
Fig. 1 is a side elevation of the machine of the present invention.
Figure 2:
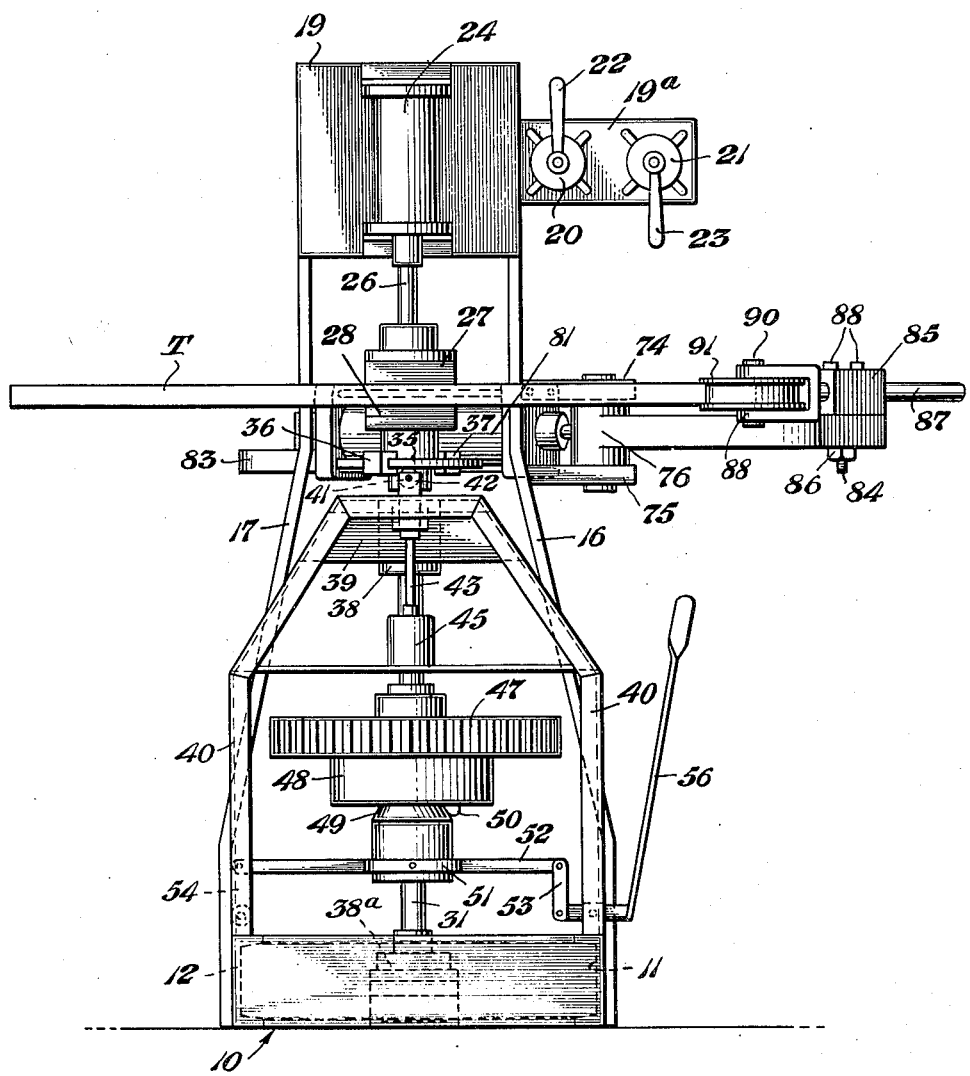
Fig. 2 is an end elevation of the machine of the present invention.

Referring to the figures of the drawing and particularly Figures 1 and 2, the machine of the present invention includes a base 10 having sides formed from a pair of channel members 11 and 12. The channels 11 and 12 may be spaced as by a pair of cross bars 13 and 14 suitably welded to the channels, which also serve to support a speed reducer 15; other cross braces may also be provided. Welded to one end of the channels 11 and 12 are a pair of vertically extending plates 16 and 17, joined at their top as by a cover member 18 and at their front end by a plate 19.

The channel member 19a extending from plate 19 serves to support a pair of four-way valves 20 and 21 of a conventional construction and provided with operating handles 22 and 23. Supported by the plate 19 is a pneumatic cylinder 24 provided with a suitable pitson 25 and rod 26 terminating in a plate 27; the entire assembly of cylinder 24, piston 25, rod 26 and plate 27 functioning as a hold-down ram for the table top T as will be hereinafter set forth. A plate 28 provided with a pair of prongs 29 and 30 extending into the top T serves to support and rotate the table top T without slippage. The plate 28 is supported on and rotated with a vertical shaft 31 by a flanged coupling 32 positioned on a shaft 31. The shaft 31 also carries between the coupling 32 and a collar 34, a cam plate 35 provided with a pair of adjustable cams 36 and 37, as shown, although any number of such cams may be provided.

The shaft 31 is supported for rotation in the bearing 38 in turn supported by a cross member 39 on the frame 40 and also on a bearing indicated at 38a. Cooperating with the cam plate 35 and the cams 36 and 37 is a follower roller 41 supported in a fork 42 on the rod 43. The rod 43 and fork 42 are supported for reciprocating motion by the frame 40 and a spring (not shown) urges the rod 43 upwardly into engagement with the cam plate. The lower end of the rod 43 operates the four-way valve 45.

The lower portion of the shaft 31 is connected to a gear 47 by a clutch 48 engaged and disengaged by the cone 49 which operates the lever 50. The cone 49 is in turn operated by ring 51 pivotally connected to the usual clutch shifter collar. The ring 51 is carried by the member 52 pivotally carried by links 53 and 54. The link 53 is pivotally connected to the lever 54 pivoted on frame 40 and connected to the operating lever 56. Movement of the operating lever 56 in a clockwise direction in Fig. 2 will, therefore, lift the cone 49 of the clutch 48 actuating the clutch 48, to connect for operation gear 47 and shaft 31 so that the shaft 31 is rotated in a counterclockwise direction as indicated by the arrow in Figure 6.

The gear 47 meshes with a drive pinion 59 driven by the speed reducer 15. The speed reducer 15 is in turn provided with a driven pulley 60 driven by the belt 61. The belt 61 is driven by a pulley 62 rotatable with the driven shaft 63 of the speed selector 64 (see Fig. 4). The speed selector 64 is driven by a pulley 65 driven by a belt 66 driven by a pulley 67 on the drive shaft of the motor 68. The speed selector is operative through a suitable range of speeds by an operating lever 69 pivotally connected at 70 to the piston rod 71. The piston rod 71 is operated by a piston 72 within the pneumatic cylinder 73; the assembly of piston 72, pneumatic cylinder 73 and piston functioning as a speed selector ram, so that movement of the rod 71 upon the lever 69 will serve to change the speed of operation of the shaft 63 and as hereinafter set forth the speed of rotation of table top T.

Extending from the plate 16 are a pair of ears 74 and 75 having journaled therebetween a pivot 76 for a pressure arm 77. Pivoted to one end of the pressure arm 77, at 78, is a piston rod 79 operatively connected to a piston 80 within the cylinder 81. The cylinder 81, piston 80 and piston rod 79 together from a pressure arm ram. The cylinder 81 is pivotally supported at 82 on an arm 83 extending from the plate 17. A spring 73a is provided to absorb the shock on return stroke of cylinder. Mounted on a center bolt 84 on the other end of the pressure arm 77 and angularly adjustable thereon is a block 85. A nut 86 on the bolt 84 serves to retain the block in any desired angular setting. Slidably mounted within the block 85 is a rod 87 held in position relative to the block 85 by set screws 88. The rod 87 carries a fork 89 at one end and mounted in the fork 89 for rotation on the pivot pin 90 is a roller 91, having flanges 91a.

In Figure 5 there is shown a portion of a table top T including a plurality of layers 92, and having an edge groove 93. The edging E includes an ornamental ribbon portion 94 and a tongue portion 95 continuously adapted to extend into the groove 93 and be frictionally retained therein although, if desirable, a suitable adhesive or a nail such as nail N may be used.

Figure 6:
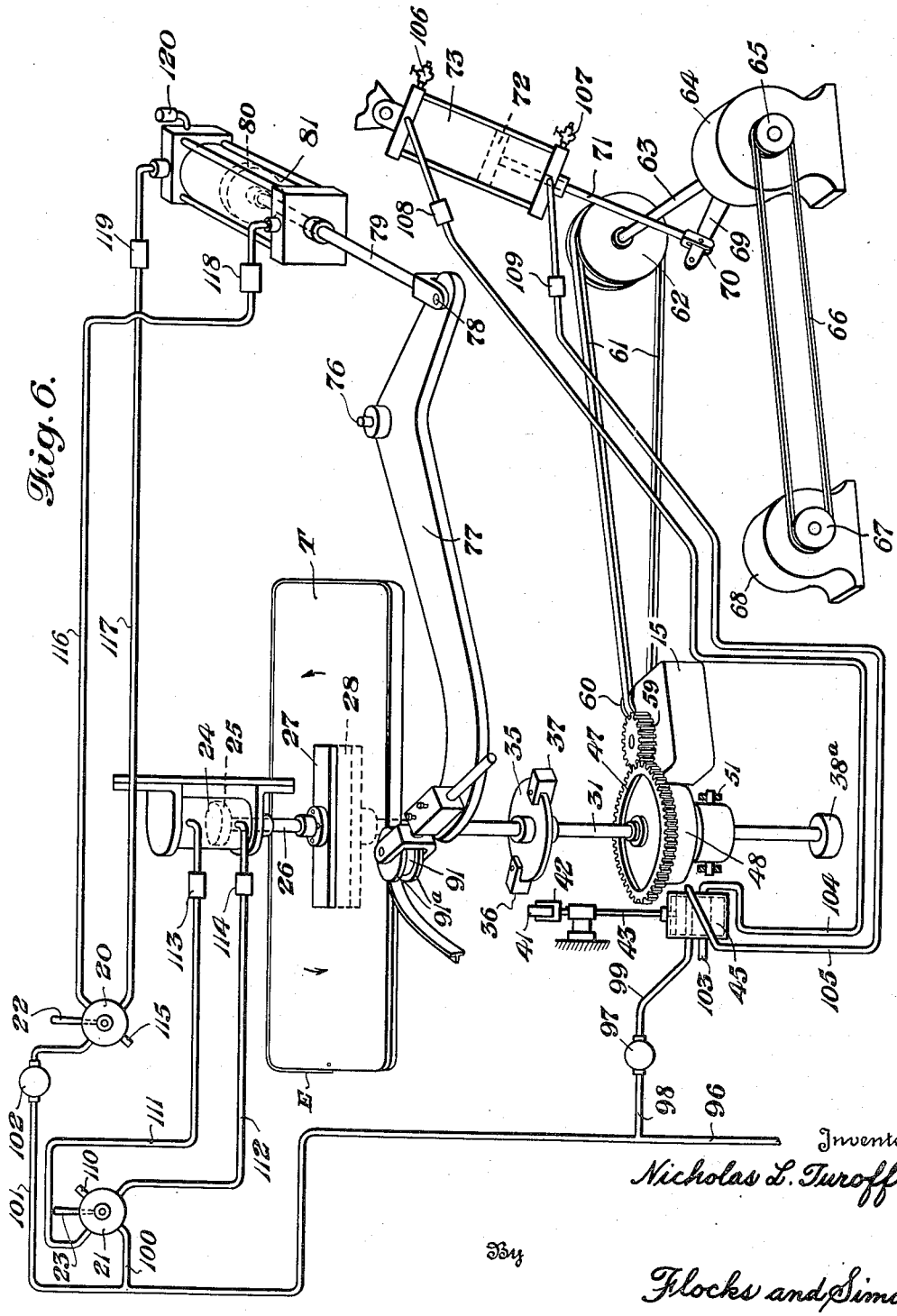
Fig. 6 is a circuit diagram of the various elements of the machine.

Referring to Figure 6 there is here diagrammatically shown the various elements of the machine and the control circuit therefor. An air supply pipe is indicated at 96 which may be connected to any suitable source of high pressure air or other motivating fluid. The pipe 96 is connected to pressure regulator 97 by pipe 98 and the pressure regulator is in turn connected to four-way control valve 45 by a pipe 99. Another branch pipe 100 connects the supply pipe 96 to the four-way hold down control valve 21 and still another branch pipe 101 connects the air supply pipe 96 to the four-way pressure arm control valve 20 through a pressure regulator 102.

The valve 45 is provided with an exhaust pipe 103 and a pair of pipes 104 and 105 connected through air speed regulating valves 108 and 109 to opposite ends of the cylinder 73. Bleeders 106 and 107 are also provided for manual operation. The valve 21 is provided with an exhaust pipe 110 and is connected by pipes 111 and 112 through air speed regulating valves 113 and 114 with the opposite ends of cylinder 24. The valve 20 is provided with an exhaust pipe 115 and is connected by pipes 116 and 117 through the air speed regulating valves 118 and 119 with opposite ends of the cylinder 81. One end of cylinder 81 is also provided with a relief valve 120.

Operation

Figure 7:
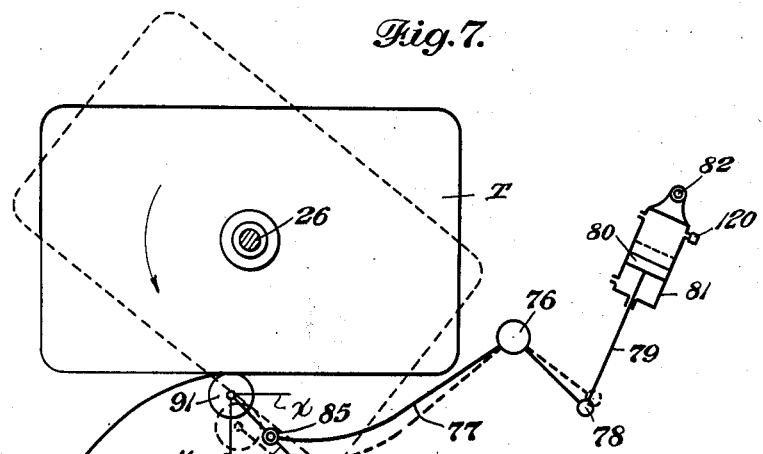
Fig. 7 is a diagrammatic illustration of the pressure arm and pressure piston in assembling an edging on a generally rectangular table top.
Figure 8:
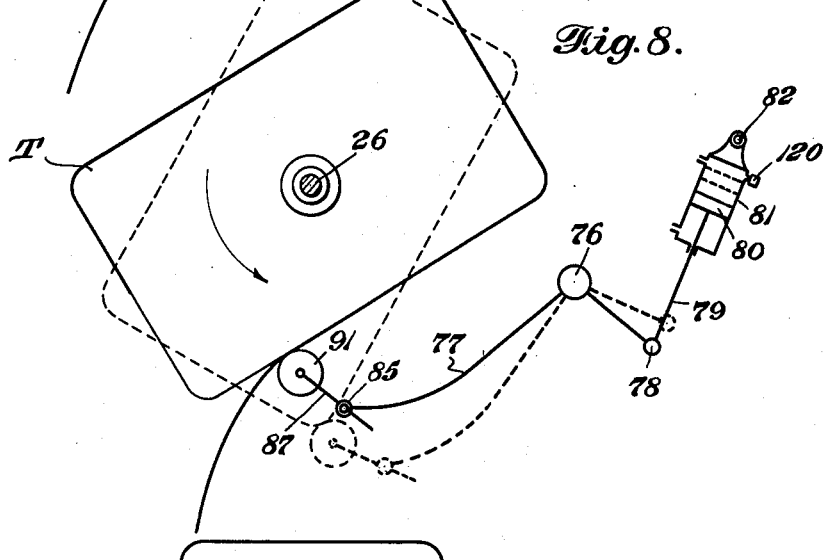
Fig. 8 is a view similar to Fig. 7 with the piston, pressure arm and table top in another position.

In operating the machine of the present invention the operator initially inserts a table top T between the plates 27 and 28 so that the top is approximately centered therein. Thereafter he operates the valve 21 to a position to pass air from the supply pipe 96 through pipe 100, the valve 21, pipe 111, and the speed control valve 113 to the upper end of the hold down cylinder 24. This action forces the rod 26 downwardly and firmly clamps the table top between the plates 27 and 28. Thereafter the rod 87 and block 85 are adjusted so that the roller 91 will at all positions of the table top T exert a force not only perpendicular to the edge of the table top but also in a direction opposed to the direction of rotation. The importance of this angular adjustment is evident by referring to Figures 7 to 9, inclusive. In the full line position shown in Figure 7, for example, the arm 77 exerts a force about equally distributed perpendicularly to the edge of the table top and parallel thereto and opposed to the direction of rotation, i. e. in the direction of the arrows $x$ and $y$. The force $y$ tends to force the edging E into the edge of the table top T and the force $x$ tends to exert a pull or stretch on the edging E so as to insure a snug fit. As shown in dotted line position, after the top T has turned so that the roller 91 has passed beyond the corner of the top there is only a slight force exerted perpendicularly to the edge of the top T. If, therefore, one attempted to increase the force $x$ in the full line position beyond that shown there would be insufficient force perpendicular to the table top (force $y$) in the dotted line position.

Figure 9:
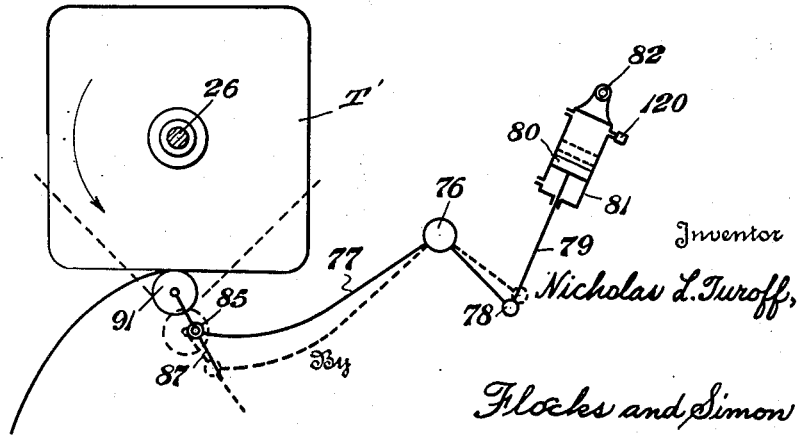
Fig. 9 is a diagrammatic view of the assembly of edging with a generally square table top.

The effective length of the rod 87 should also be adjusted so as to permit the piston 80 to operate within proper limits in the cylinder 81. The foregoing adjustments once made for a particular table top will be proper for any other top of the same size. The cams 36 and 37 are also properly adjusted so that they will be operative to slow down the rotation of the table top after the edging has been applied to each of the longitudinal edges since too rapid a speed of rotation at the corners may cause the edging to be spaced from the edge immediately after each corner. Inasmuch as the table top T is long and relatively narrow only two cams are shown and the top is rotated slowly from a point where the roller 91 begins to round the corner, all along the end edge and around the next corner and rapidly only along the two longitudinal edges. Where a square table top, such as the table top T' of Figure 9, is being treated either four cams are used and the speed is reduced four times or no cams are used and the speed of the driving motor is reduced. As may be understood, cams of any shape or size may be used for speed reduction where table tops of irregular shape are being assembled with edging. By this arrangement the tops may be assembled with the edging at the maximum speed compatible with smooth assembly.

After the foregoing adjustments have been made the operator manually inserts one end of a precut strip of edging E as at the point indicated at point P (Fig. 7) on the clamped table top T and adjusts the handle 22 of the valve 20 so as to allow air to flow through pressure regulator 102, pipe 117 and the air speed control valve 119 into one end of the cylinder 81. This action exerts a pressure to force the rod 79 out of the cylinder 81 and applies pressure to the arm 77. The air speed control valve 118 traps the air on the rod end of the cylinder 81 and allows only a predetermined volume of air to pass through it. This governs the speed of the piston rod 79 and the arm 77, thus preventing a too sudden engagement of the roller 91 with the edging 94. Speed control valve 119 acts in a similar capacity on the reverse stroke of the piston rod 79. Any outward movement of the rod 79 by the piston 80 simultaneously exhausts air through the air speed control valve 118, the pipe 116 and the valve 20 which connects the pipe 116 to exhaust pipe 115. Inward movement of the rod 79 exhausts air through speed control valve 119, pipe 117 and the valve 20 which connects the pipe 117 to exhaust pipe 115. The operator thereafter pulls lever 56 to connect shaft 31 to the gear 47 and thereby cause the motor 68 to rotate the shaft 31 through belt 66, speed selector 64, shaft 63, belt 61, speed reducer 15, pinion 61, gear 47 and clutch 48. Thereafter as the shaft 31 rotates the cam members 36 and 37 strike the roller 41 to move the rod 43 downwardly which operates the plunger of the valve 45 to a position to cause air to flow into pipe 104 and through the air speed regulator 108 into the upper end of the cylinder 73. At the same time the valve 45 connects pipe 105 to the exhaust pipe 103. This action moves the piston 72 downwardly and causes rod 71 to move the lever 69 downwardly to correspondingly adjust the speed selector 64 to a lower speed. When the roller 41 moves off the cams 36 and 37 the rod 43 moves upwardly to operate the plunger to a position to reverse the flow of air, so that air flows through pipe 105 and out of pipe 104. This last action causes the piston 72 to move upwardly to cause the speed selector to adjust to a higher speed. During this air movement through pipes 104 and 105 manual valves 106 and 107 are closed, but if it is desired to operate the machine at constant speed, lever 69 is locked manually into the proper position and valves 106 and 107 are opened.

When a complete rotation of the top has been produced the handle 56 is moved in an inward direction to disengage the clutch from shaft 31, from the gear 47 and stop the rotation of the table top T. Thereafter the handle 22 of the valve 20 is moved to a position to connect pipe 116 to the branch air supply pipe 101 and simultaneously connect pipe 117 to exhaust 115. This action causes rod 79 to move inwardly against the action of the spring 79a to move the pressure roller 91 away from edge of the top T so that the flanges 91a of the roller will not interfere with removal of the top T.

The handle 23 of the valve 21 is then moved to a position to connect pipe 112 to the branch air supply pipe 100 and pipe 111 to exhaust pipe 110. The flow of air through pipe 112 will lift the piston 25, the rod 26 and the plate 27 to release the top T from the plates 27 and 28.

Figure 9 demonstrates the action of the relief valve 120. As shown in this figure the arm 77 is being rapidly moved in a counterclockwise direction so that the piston 80 is being moved rapidly upward. Unless air is allowed to exhaust through the relief valve 120 therefor, an excessive pressure will be built up, the rotation of the top T will be retarded and the table top T may break loose from the prongs 29 and 30 on the plate 28 to cause scarring.

It will be obvious to those skilled in the art that various changes may be made without departing from the spirit of the invention and therefore the invention is not limited to what is shown in the drawings and described in the specification but only as indicated in the appended claims.

I claim:

1. An apparatus for assembling a table top or the like with edging therefor comprising means for rotating said top, a pressure arm having one end positioned adjacent the edge of said rotating top, means including a fluid pressure cylinder and piston for applying a uniform fluid pressure through said arm to said edging as it is being assembled with said top, a conduit connected to each end of said cylinder, valve means connected to a source of fluid pressure and said conduits to supply pressure fluid to either end of said cylinder to thereby move said pressure arm toward or away from said top, a speed control valve in each of said conduits to control the speed of movement of the said pressure arm, and relief means attached to one end of the cylinder to prevent application of an excessive fluid pressure when the piston is being moved rapidly against the source of the fluid pressure.

2. An apparatus for assembling a table top or the like with edging therefor, comprising means for rotating said table top, an arm operatively engaging said table top and adapted to apply said edging, fluid pressure means cooperating with said arm to adjustably hold said arm in engagement with said table top, a cam mounted for rotation with said rotating means, a follower engaging said cam at predetermined intervals, and a control means responsive to said cam and follower for varying the speed of rotation of said rotating means, thereby allowing said arm to automatically apply the edging around the curved portions of said table top in a uniform manner.

3. An apparatus for assembling a table top or the like having curved portions and relatively straight portions with an edging therefor comprising means for rotating said top, means for continuously pressing said edging into firm engagement with said top, and control means secured to said rotating means including cam means and a valve, said valve responsive to the movement of said cam means for controlling the speed of said rotating means and operative to reduce the speed of said rotating means automatically when said pressing means is pressing said edging into the relatively straight portions of said top.

4. Apparatus in accordance with claim 3 wherein the control means for automatically controlling the speed of said rotating means is actuated by fluid pressure.

5. Apparatus in accordance with claim 3 including means for holding said table top onto said rotating means, said holding means being actuated by fluid pressure and contacting the table top on the opposite surface than said rotating means.

6. An apparatus for assembling a table top or the like having curved portions and relatively straight portions and edging therefor comprising means for rotating said top including a speed changing means, means for continuously pressing said edging into firm engagement with said top, and control means responsive to the rotational position of said top and operatively connected to said speed changing means actuated by fluid pressure to reduce the speed of said rotating means when said pressing means is pressing said edging into the curved portion of said top and increase the speed of said rotating means when said pressing means is pressing said edging into the relatively straight portions of said top.

7. Apparatus in accordance with claim 6 wherein said pressing means includes a pressure arm pivoted intermediate its ends and having one end positioned adjacent the edge of said rotating top, and a fluid pressure cylinder and piston connected to the other end of said pressure arm for applying a uniform fluid pressure through said arm to said edging as it is being assembled with said top.

8. Apparatus in accordance with claim 7 including means for holding said table top onto said rotating means, said holding means being actuated by fluid pressure and contacting the table top on the opposite surface than said rotating means.

9. An apparatus for assembling a table top or the like having curved portions and relatively straight portions and edging therefor comprising means for rotating said top including a speed changing means, means for continuously pressing said edging into firm engagement with said top, and control means secured to said rotating means including a cam rotatable with said top and operatively connected to said speed changing means actuated by fluid pressure to reduce the speed of said rotating means when said pressing means is pressing said edging into the curved portion of said top and increase the speed of said rotating mean when said pressing means is pressing said edging into the relatively straight portions of said top.

10. An apparatus for assembling a table top or the like having curved portions and relatively straight portions and edging therefor comprising means for rotating said top including a speed changing means, means for continuously pressing said edging into firm engagement with said top, and control means responsive to the rotational position of said top and operatively connected to said speed changing means to reduce the speed of said rotating means when said pressing means is pressing said edging into the curved portion of said top and increase the speed of said rotating means when said pressing means is pressing said edging into the relatively straight portions of said top.

11. Apparatus for assemblying a table top having curved portions and relatively straight portions with an edging therefor, comprising means for rotating said top, a pressure arm having one end positioned adjacent the edge of said rotating top, fluid pressure means operatively connected to the other end of said pressure arm for applying a uniform pressure through said arm to said edging as it is being assembled with said top, means controlling the flow of pressure fluid to said fluid pressure means, and control means responsive to the rotational position of said top for reducing the speed of said rotating means when said pressure arm is pressing said edging into the curved portions of said top and increasing the speed of said rotating means when said pressure arm is pressing said edging into the relatively straight portions of said top.

NICHOLAS L. TUROFF.

References Cited in the file of this patent

UNITED STATES PATENTS

| Number | Name | Date |
|---|---|---|
| 944,423 | Feix | Dec. 28, 1909 |
| 1,135,469 | Sutherland | Apr. 13, 1915 |
| 1,588,953 | Edmunds | June 15, 1925 |
| 2,182,626 | Fischer | Dec. 5, 1929 |
| 2,190,611 | Sembdner | Feb. 13, 1940 |
| 2,190,821 | Broomham | Feb. 20, 1940 |
| 2,192,778 | Stacy | Mar. 5, 1940 |
| 2,241,414 | Morris | May 13, 1941 |
| 2,337,366 | Beck | Dec. 21, 1943 |
| 2,342,745 | Maize | Feb. 29, 1944 |
| 2,374,909 | Williams | May 1, 1945 |
| 2,450,987 | Potter | Oct. 12, 1948 |